United States Patent
Krappe et al.

(10) Patent No.: US 7,199,456 B2
(45) Date of Patent: Apr. 3, 2007

(54) INJECTION MOULDED PRODUCT AND A METHOD FOR ITS MANUFACTURE

(75) Inventors: Anu Krappe, Tampere (FI); Samuli Strömberg, Tampere (FI)

(73) Assignee: Rafsec Oy (FI)

( * ) Notice: Subject to any disclaimer, the term of this patent is extended or adjusted under 35 U.S.C. 154(b) by 0 days.

(21) Appl. No.: 10/750,181

(22) Filed: Dec. 31, 2003

(65) Prior Publication Data

US 2005/0025943 A1   Feb. 3, 2005

Related U.S. Application Data

(63) Continuation of application No. PCT/FI02/00598, filed on Jul. 3, 2002.

(30) Foreign Application Priority Data

Jul. 4, 2001 (FI) .................. 20011458

(51) Int. Cl.
*H01L 23/02* (2006.01)
*H01L 23/14* (2006.01)

(52) U.S. Cl. ............ 257/679; 257/684; 257/701; 257/702

(58) Field of Classification Search ......... 428/137, 428/209; 257/679, 684, 701–702
See application file for complete search history.

(56) References Cited

U.S. PATENT DOCUMENTS

| | | |
|---|---|---|
| 3,628,977 A | 12/1971 | Deegan |
| 3,897,964 A | 8/1975 | Oka et al. |
| 4,021,705 A | 5/1977 | Lichtblau |
| 4,253,899 A | 3/1981 | Takemoto et al. |
| 4,288,499 A | 9/1981 | Kielbania, Jr. |
| 4,303,949 A | 12/1981 | Peronnet |
| 4,419,413 A * | 12/1983 | Ebihara ............ 428/548 |
| 4,443,491 A | 4/1984 | McIntyre |
| 4,450,024 A | 5/1984 | Haghiri-Tehrani et al. |
| 4,455,359 A | 6/1984 | Patzold et al. |
| 4,686,152 A | 8/1987 | Matsubayashi et al. |
| 4,841,712 A | 6/1989 | Roou |
| 4,846,922 A | 7/1989 | Benge et al. |
| 4,866,505 A | 9/1989 | Roberts et al. |
| 4,897,534 A | 1/1990 | Haghiri-Tehrani |
| 4,954,814 A | 9/1990 | Benge |
| 4,977,006 A | 12/1990 | Smith |
| 5,026,452 A * | 6/1991 | Kodai ............ 156/293 |
| 5,172,461 A | 12/1992 | Pichl |
| 5,201,976 A | 4/1993 | Eastin |
| 5,244,836 A | 9/1993 | Lim |

(Continued)

FOREIGN PATENT DOCUMENTS

DE   19511300   10/1996

(Continued)

*Primary Examiner*—Cathy F. Lam
(74) *Attorney, Agent, or Firm*—Fitch, Even, Tabin & Flannery

(57) ABSTRACT

The invention relates to an injection moulded product comprising an attached body which has been attached by an intermediate layer. The body has been attached to the injection moulded product by an intermediate layer attached to the body prior to the injection moulding. The invention also relates to a method for the manufacture of an injection moulded product comprising a body which has been attached by an intermediate layer.

19 Claims, 2 Drawing Sheets

U.S. PATENT DOCUMENTS

| | | | |
|---|---|---|---|
| 5,250,341 A * | 10/1993 | Kobayashi et al. | 428/137 |
| 5,266,355 A | 11/1993 | Wernberg et al. | |
| 5,294,290 A | 3/1994 | Reeb | |
| 5,302,431 A | 4/1994 | Schultz | |
| 5,309,326 A * | 5/1994 | Minoru | 361/790 |
| 5,337,063 A | 8/1994 | Takahira | |
| 5,344,808 A | 9/1994 | Watanabe et al. | |
| 5,384,955 A | 1/1995 | Booth et al. | |
| 5,525,400 A | 6/1996 | Manser et al. | |
| 5,528,222 A * | 6/1996 | Moskowitz et al. | 340/572.7 |
| 5,534,372 A | 7/1996 | Koshizuka et al. | |
| 5,598,032 A | 1/1997 | Fidalgo | |
| 5,667,541 A | 9/1997 | Klun et al. | |
| 5,689,263 A | 11/1997 | Dames | |
| 5,690,773 A * | 11/1997 | Fidalgo et al. | 156/267 |
| 5,714,305 A | 2/1998 | Teng et al. | |
| 5,759,683 A | 6/1998 | Boswell | |
| 5,781,110 A | 7/1998 | Habeger, Jr. et al. | |
| 5,810,959 A | 9/1998 | Tanaka et al. | |
| 5,822,194 A | 10/1998 | Horiba et al. | |
| 5,837,367 A | 11/1998 | Ortiz, Jr. et al. | |
| 5,850,690 A | 12/1998 | Launay et al. | |
| 5,852,289 A | 12/1998 | Masahiko | |
| 5,867,102 A | 2/1999 | Souder et al. | |
| 5,918,113 A | 6/1999 | Higashi et al. | |
| 5,918,363 A | 7/1999 | George et al. | |
| 5,920,290 A | 7/1999 | McDonough et al. | |
| 5,932,301 A | 8/1999 | Kamiyama et al. | |
| 5,935,497 A | 8/1999 | Rose | |
| 5,936,847 A | 8/1999 | Kazle | |
| 5,937,512 A | 8/1999 | Lake et al. | |
| 5,952,713 A | 9/1999 | Takahira et al. | |
| 5,962,840 A | 10/1999 | Haghiri-Tehrani et al. | |
| 5,963,134 A | 10/1999 | Bowers et al. | |
| 5,969,951 A | 10/1999 | Fischer et al. | |
| 5,973,600 A | 10/1999 | Mosher, Jr. | |
| 5,976,690 A | 11/1999 | Williams et al. | |
| 5,982,284 A | 11/1999 | Baldwin et al. | |
| 5,994,263 A | 11/1999 | Ohshima et al. | |
| 6,012,641 A | 1/2000 | Watada | |
| 6,025,780 A | 2/2000 | Bowers et al. | |
| 6,040,630 A * | 3/2000 | Panchou et al. | 257/783 |
| 6,066,377 A | 5/2000 | Tonyali et al. | |
| 6,066,378 A | 5/2000 | Morii et al. | |
| 6,070,803 A | 6/2000 | Stobbe | |
| 6,077,382 A | 6/2000 | Watanabe | |
| 6,090,484 A | 7/2000 | Bergerson | |
| 6,107,920 A | 8/2000 | Eberhardt et al. | |
| 6,113,728 A | 9/2000 | Tsukagoshi et al. | |
| 6,147,662 A | 11/2000 | Grabau et al. | |
| 6,161,761 A | 12/2000 | Ghaem et al. | |
| 6,177,859 B1 | 1/2001 | Tuttle et al. | |
| 6,180,256 B1 | 1/2001 | Sargeant | |
| 6,204,764 B1 | 3/2001 | Maloney | |
| 6,206,292 B1 | 3/2001 | Robertz et al. | |
| 6,220,516 B1 | 4/2001 | Tuttle et al. | |
| 6,232,870 B1 | 5/2001 | Garber et al. | |
| 6,248,199 B1 | 6/2001 | Smulson | |
| 6,249,199 B1 | 6/2001 | Liu | |
| 6,259,408 B1 * | 7/2001 | Brady et al. | 343/700 MS |
| 6,288,905 B1 | 9/2001 | Chung | |
| 6,293,470 B1 | 9/2001 | Asplund | |
| 6,315,856 B1 | 11/2001 | Asagiri et al. | |
| 6,325,294 B2 | 12/2001 | Tuttle et al. | |
| 6,330,162 B2 | 12/2001 | Sakamoto et al. | |
| 6,353,420 B1 | 3/2002 | Chung | |
| 6,358,588 B1 | 3/2002 | Edwards et al. | |
| 6,365,546 B1 | 4/2002 | Kometani | |
| 6,371,378 B1 | 4/2002 | Brunet et al. | |
| 6,376,769 B1 | 4/2002 | Chung | |
| 6,404,643 B1 | 6/2002 | Chung | |
| 6,412,470 B1 | 7/2002 | Denz | |
| 6,412,702 B1 | 7/2002 | Ishikawa et al. | |
| 6,421,013 B1 | 7/2002 | Chung | |
| 6,432,235 B1 | 8/2002 | Bleckmann et al. | |
| 6,446,874 B1 | 9/2002 | Elbaz et al. | |
| 6,451,154 B1 | 9/2002 | Grabau et al. | |
| 6,478,229 B1 | 11/2002 | Epstein | |
| 6,480,110 B2 | 11/2002 | Lee et al. | |
| 6,497,371 B2 | 12/2002 | Kayanakis et al. | |
| 6,520,544 B1 | 2/2003 | Mitchell et al. | |
| 6,522,549 B2 | 2/2003 | Kano et al. | |
| 6,540,865 B1 | 4/2003 | Miekka et al. | |
| 6,555,213 B1 | 4/2003 | Koneripalli et al. | |
| 6,557,766 B1 | 5/2003 | Leighton | |
| 6,569,280 B1 | 5/2003 | Mehta et al. | |
| 6,595,426 B1 * | 7/2003 | Brunet et al. | 235/487 |
| 6,600,418 B2 | 7/2003 | Francis et al. | |
| 6,607,834 B2 | 8/2003 | Davis et al. | |
| 6,609,728 B1 | 8/2003 | Voerman et al. | |
| 6,644,551 B2 | 11/2003 | Clayman et al. | |
| 6,694,872 B1 | 2/2004 | LaBelle et al. | |
| 6,736,918 B1 | 5/2004 | Ichikawa et al. | |
| 6,780,668 B1 | 8/2004 | Tsukahara et al. | |
| 6,843,422 B2 | 1/2005 | Jones et al. | |
| 6,853,286 B2 | 2/2005 | Nikawa et al. | |

FOREIGN PATENT DOCUMENTS

| | | |
|---|---|---|
| DE | 19530823 | 2/1997 |
| DE | 19634473 | 1/1998 |
| DE | 197 33 800 | 2/1999 |
| DE | 19737565 | 3/1999 |
| DE | 19758057 | 5/1999 |
| DE | 19915765 | 10/2000 |
| EP | 0227293 | 7/1987 |
| EP | 0249266 | 12/1987 |
| EP | 0545910 | 6/1993 |
| EP | 0575631 | 12/1993 |
| EP | 0620091 | 10/1994 |
| EP | 0625832 | 11/1994 |
| EP | 0 692 770 | 1/1996 |
| EP | 0692770 | 1/1996 |
| EP | 0704816 | 4/1996 |
| EP | 0706152 | 4/1996 |
| EP | 0717371 | 6/1996 |
| EP | 0730254 | 9/1996 |
| EP | 0737935 | 10/1996 |
| EP | 0788159 | 8/1997 |
| EP | 0824270 | 2/1998 |
| EP | 0870627 | 10/1998 |
| EP | 0922555 | 6/1999 |
| EP | 0991014 | 4/2000 |
| EP | 1014302 | 6/2000 |
| EP | 1130542 | 9/2001 |
| EP | 1132859 | 9/2001 |
| EP | 1172761 | 1/2002 |
| EP | 1225538 | 7/2002 |
| FI | 20001345 | 12/2001 |
| FI | 20002707 | 6/2002 |
| FR | 2744270 | 8/1997 |
| FR | 2780534 | 12/1999 |
| FR | 2782821 | 3/2000 |
| GB | 2279612 | 1/1995 |
| GB | 2294899 | 5/1996 |
| JP | 61-268416 | 11/1986 |
| JP | 2-14194 | 1/1990 |
| JP | 05169843 | 7/1993 |
| JP | 5279841 | 10/1993 |
| JP | 09197965 | 7/1997 |
| JP | 11221986 | 8/1999 |
| JP | 2000048153 | 2/2000 |
| JP | 2000057287 | 2/2000 |
| JP | 2000113147 | 4/2000 |

| | | | | | |
|---|---|---|---|---|---|
| JP | 2000215288 | 8/2000 | WO | WO 99/24934 | 5/1999 |
| JP | 2000235635 | 8/2000 | WO | WO 99/40760 | 8/1999 |
| JP | 2000242740 | 9/2000 | WO | WO 99/48071 | 9/1999 |
| JP | 2001118040 | 4/2001 | WO | WO 00/45353 | 8/2000 |
| JP | 2002140672 | 5/2002 | WO | WO 01/16878 | 3/2001 |
| WO | WO 93/01571 | 1/1993 | WO | WO 01/85451 | 11/2001 |
| WO | WO 97/14112 | 4/1997 | WO | WO 02/49093 | 6/2002 |
| WO | WO 98/44195 | 10/1998 | WO | WO 02/082368 | 10/2002 |
| WO | WO 98/49652 | 11/1998 | | | |
| WO | WO 99/08245 | 2/1999 | | | |

\* cited by examiner

INJECTION MOULDED PRODUCT AND A METHOD FOR ITS MANUFACTURE

This is a continuation of prior application Ser. No. PCT/FI02/00598 filed on Jul. 3, 2002, designating the United States, which claims the benefit of Finland Ser. No. 20011458, filed on Jul. 4, 2001, which are hereby incorporated by reference in thier entirety.

The present invention relates to an injection moulded product comprising an attached body which has been attached by an intermediate layer, and a method for the manufacture of an injection moulded product comprising a body which has been attached by an intermediate layer.

BACKGROUND

Injection moulded products may need attached bodies, such as electronic components attached on a surface of the injection moulded product or embedded into the product. Attachment techniques according to prior art are complicated because the body must be attached to the product after the injection moulding, i.e. to the ready injection moulded product. Films or glue must be laid to the surface of the injection moulded product or the surface of the body after the injection moulding to attain a joint between the injection moulded product and the body. If the body is to be embedded in the injection moulded product, air often remains inside the product producing a cave near the body and weakening the strength of the injection moulded product.

SUMMARY

By a method according to the invention, it is possible to avoid the above-mentioned problems. An injection moulded product according to the invention is characterized in that the body has been attached to the injection moulded product by an intermediate layer attached to the body prior to the injection moulding. The method according to the invention is characterized in that the body is attached to the injection moulded product by an intermediate layer adhered to the body prior to the injection moulding.

An intermediate layer, such as a thermoplastic adhesive bonding film or another thermoplastic film formed for example by extrusion, is attached to the body prior to the injection moulding. A body to be attached to an injection moulded product, either on the surface of an injection moulded product or embedded into the injection moulded product, is easily attached in connection with the injection moulding.

Thermoplastic adhesive bonding films used as an intermediate layer have certain features which make them advantageous for connecting the injection moulding layer and the body. The injection moulding layer should be understood broadly in this context; it is any layer of any shape formed by the injection moulding. The injection moulding layer can cover the body partly or completely.

The thermoplastic adhesive bonding films can be attached to the body prior to the injection moulding, because they can be attached to the body by heating the film, and when the temperature of the film falls back to room temperature, it has no adherence but the bonds formed with other surfaces during heating remain.

The thermoplastic adhesive bonding films are a certain kind of an intermediate form between conventional thermoplastic films and adhesives. Their characteristics are in most cases a consequence of the orientation of the films. The preferred thermoplastic adhesive bonding films are based on modified polyolefins, modified polyurethanes or modified polyesters.

When an injection moulded product is formed, the body to be attached to the injection moulded product is first covered partly or completely with the intermediate layer, such as a thermoplastic adhesive bonding film. The body is then placed into an injection mould and the molten plastic is injected onto it. The hot plastic melts the intermediate layer, thereby forming a firm bond between the body and the injection moulding layer.

One important embodiment of the present invention is a smart card and a method for its manufacture. The smart cards are rigid cards comprising a so-called radio frequency identification (RFID) circuit which is contactless and is typically used at a distance of some tens of centimeters from a reader antenna. Such a smart card can be used for example as an electrical purse, as a ticket in public service vehicles, or for personal identification.

Special advantages in addition to the mentioned general advantages are achieved in the processing of a smart card. The intermediate layer and the injection moulding layer protect the circuitry pattern and the chip, the uneven surface of the smart card blank can be flattened out by an injection moulding layer, and the manufacturing costs are low. The material basis of the smart card blank is not restricted by heat sealing properties which is the case when a rigid card is formed by laminating different layers together.

The production of a smart card comprises the following steps:
  a circuitry pattern is formed on the surface of a carrier web to be unwound from a roll,
  a chip is attached to the circuitry pattern by a suitable flip-chip technology,
  the intermediate layer in a web form is attached to the carrier web,
  the smart card blank web is sheeted to single smart card blanks or sheets comprising several smart card blanks,
  a rigid smart card is formed by injection moulding,
  the smart card is equipped with personal identification,
  sheets comprising several smart cards are punched into separate smart cards,
  the smart card is electrically encoded (not in all cases), and
  the cards are packed.

A body to be attached to an injection moulding layer in this embodiment is a smart card blank comprising a circuitry pattern and an integrated circuit on a chip on a substrate. The smart card blanks are usually produced as a continuous web. The smart card blank web according to the invention comprises an intermediate layer in a web form and a carrier web i.e. the continuous substrate, whose surface is provided with successive and/or parallel circuitry patterns which are each equipped with an integrated circuit on a chip.

Methods for attaching the integrated circuit on the chip to a conductive circuit include the flip-chip technology which comprises several techniques. The flip-chip technology can be selected from a large variety in such a way that the production rate of the process can be maximized at an appropriate level of quality and reliability. Suitable flip-chip methods include anisotropically conductive adhesive or film (ACA or ACF) joint, isotropically conductive adhesive (ICA) joint, non-conductive adhesive (NCA) joint, solder flip-chip (FC) joint, or possibly other metallic joints. In addition to the flip-chip technology, also a wire bond or a joint made by tape automated bonding (TAB) can be used. The chip can also be placed by the flip-chip technology onto a separate structural part which is attached to the circuitry pattern. Possible materials for the carrier web include e.g. polyester or biaxially oriented polypropylene. The material of the carrier web can also be another suitable material.

The intermediate layer attached onto the carrier web makes the attachment between the intermediate layer and the injection moulding layer possible. The intermediate layer can be attached to that side of the carrier web on which the circuitry pattern has been formed and to which the integrated circuit on a chip has been attached, but it is also possible that two intermediate layers are attached, one to each side of the carrier web. The intermediate layer protects the circuitry pattern on the carrier web and the integrated circuit on the chip from the effects of e.g. chemicals and ambient conditions during processing.

Possible materials for the intermediate layer in the smart card include thermoplastic adhesive bonding films which are attached to a substrate by means of heat and pressure, or other thermoplastic films formed for example by extrusion. Suitable thermoplastic adhesive bonding films are for example 3M™ Thermo-Bond Film 845, 3M™ Thermo-Bond Film 845 G (Thermo-Bond Film products from 3M, USA), EAF-200, EAF-220, EAF-240, UAF-420, UAF-430, UAF-440 (EAF and UAF products from Adhesive Films, Inc., USA), Sikadeflex® HS 11/90 VP 85 (Sika Werke GmbH, Germany) and Bostik thermoplastic film adhesives (Bostik, USA). A suitable material for the extrusion is for example Eastman 9921 copolyester (Eastman, USA).

Thermo-Bond Films 845 and 845 G are flexible and light-coloured thermoplastic adhesive bonding films. They are based on modified polyolefin. EAF-200 is a clear film based on ethylene copolymer, EAF-220 is a clear film based on ethylene vinyl acetate copolymer and EAF-240 is based on a similar compound as EAF-200 but has a higher melting point. UAF-420, UAF-430 and UAF-440 are films based on polyurethanes. They are clear or translucent.

Sikadeflex® HS 11/90 VP 85 is a transparent film based on polyurethanes. Bostik thermoplastic film adhesives are based on polyesters or polyurethanes.

The thermoplastic adhesive bonding films can be laminated to the carrier web by using various lamination techniques. The basic methods for lamination are pressing in a press or pressing in a nip formed between two counter surfaces. By applying pressing in a nip, it is possible to attain a continuous process. At least one of the counter surfaces forming the nip may be heatable, or the thermoplastic adhesive bonding film may be heated so that it becomes tacky before the nip. The process temperatures normally vary from 120° C. to 170° C.

There must also be a certain dwell time in the nip which normally ranges from 2 to 15 seconds. The term dwell time refers to the period of time during which the smart card blank web stays in the nip. The pressure used in the nip varies from 60 to 700 kPa, depending on the thermoplastic adhesive bonding film. To obtain an optimum dwell time and pressure in the nip, the nip is preferably a nip longer than a nip formed by hard rolls. The nip can be for example a nip formed by a thermoroll and a resilient roll, wherein the pressure per unit area is lower than in a corresponding hard nip. One of the contact surfaces forming the nip can also be a shoe roll. The nip dwell time and pressure are selected according to the requirements of the thermoplastic adhesive bonding film in question. The material of the intermediate layer can also be another suitable material whose properties are at least equal to those of the above-mentioned materials.

The attachment of the integrated circuit on the chip to the carrier web can be performed on the same production line as the attachment of the intermediate layer and the carrier web to each other, or on a separate production line. After the attachment of the intermediate layer, the smart card blank web is sheeted so that it can be subjected to further processing in sheet form.

When the thermoplastic adhesive bonding film has been attached to the other or the both sides of the carrier web, the smart card blank is placed in an injection mould so that the thermoplastic adhesive bonding film comes into a contact with the injection moulding material, i.e. the molten plastic. When the molten plastic is injected onto the surface of the thermoplastic adhesive bonding film, the film is activated by the heat produced by the molten plastic, and the film and the plastic adhere to each other. When the thermoplastic adhesive bonding film and the injection moulding material cool, they form a firm bond. Suitable injection moulding materials include for example polyethylene (LDPE, HDPE), polypropylene (PP), acrylonitrile/butadiene/styrene (ABS) copolymer, polystyrene (PS), polyamide (PA), polyacetal (POM) and thermoplastic elastomer (TPE).

BRIEF DESCRIPTION OF THE DRAWINGS

In the following, the invention will be described by means of drawings, in which.

DETAILED DESCRIPTION

Figure 1:
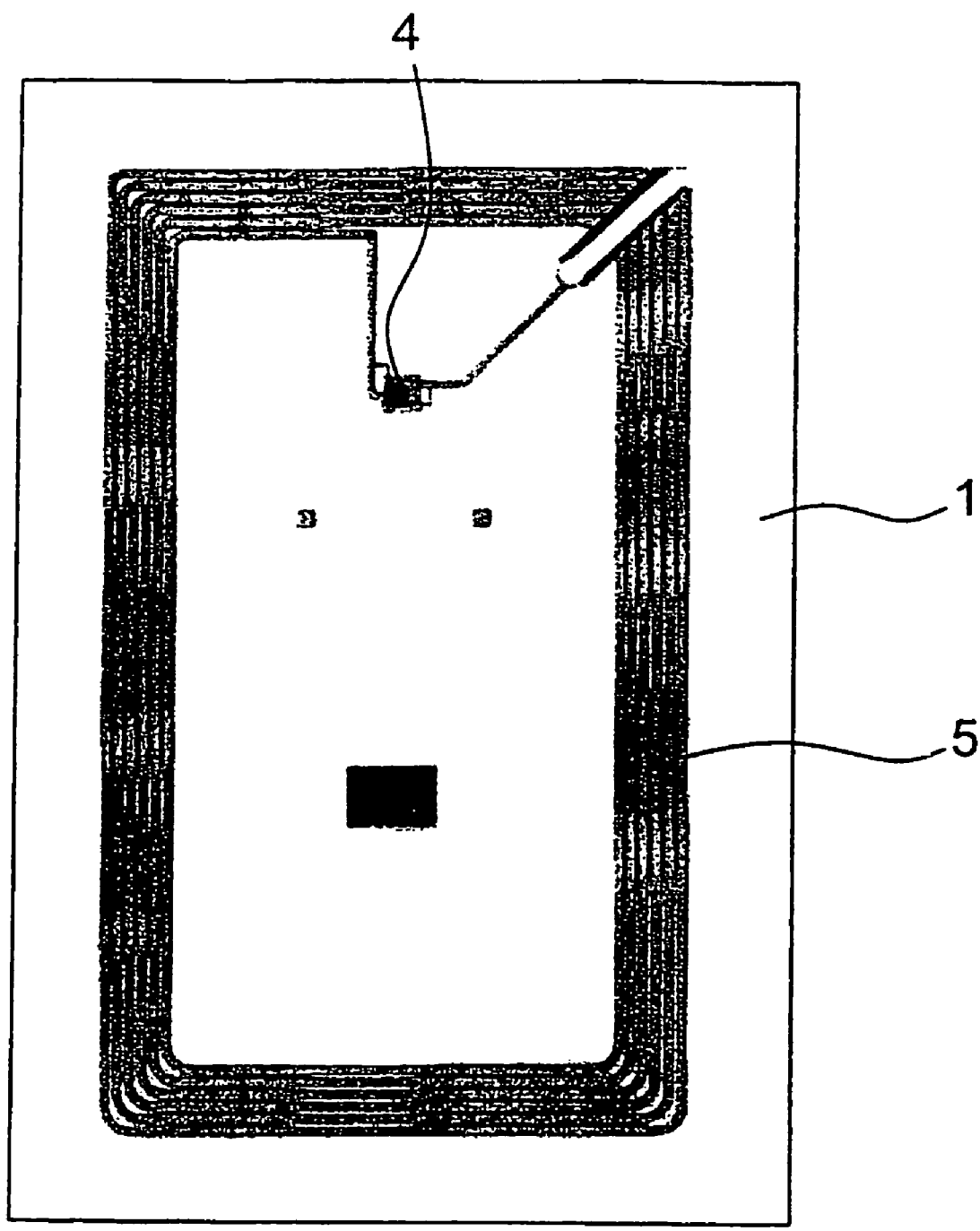
FIG. 1 shows a single smart card blank in a top view.

FIG. 1 shows a single smart card blank in a top view. The material of the carrier web 1 may be a material resistant to relatively high temperatures, such as polyester or biaxially oriented polypropylene. The carrier web 1 is a continuous web which contains circuitry patterns 5, each having an integrated circuit 4, at suitable spaces one after another and/or next to each other. The circuitry pattern can be made by printing the circuitry pattern on a film with an electroconductive printing ink, by etching the circuitry pattern on a metal film, by punching the circuitry pattern off a metal film, or by winding the circuitry pattern of e.g. a copper wire. The circuitry pattern is provided with an identification circuit, such as a radio frequency identification (RFID) circuit. The identification circuit is a simple electric oscillating circuit (RCL circuit) tuned to operate at a defined frequency. The circuit consists of a coil, a capacitor and a circuit integrated on a chip, consisting of an escort memory and an RF part for communication with a reader device. The capacitor of the RCL circuit can also be integrated on the chip or the capacitor/s can be located outside the chip.

Figure 2:
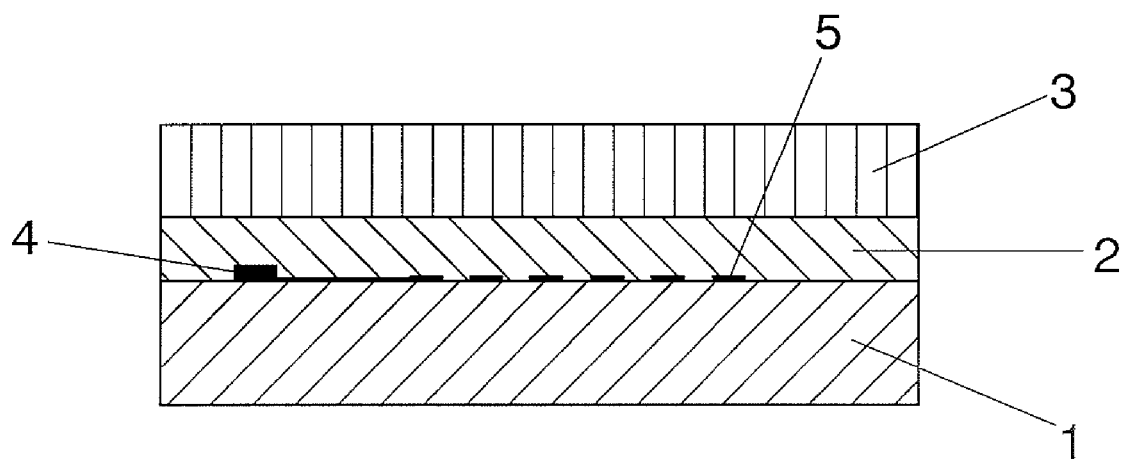
FIG. 2 shows a side view of a smart card.

FIG. 2 shows a smart card comprising a carrier web 1, an intermediate layer 2 which is attached onto the surface of the carrier web 1, and an injection moulding layer 3 which is formed on the surface of the intermediate layer.

The carrier web 1 is a plastic film. The material of the carrier web 1 can be for example polyester or biaxially oriented polypropylene.

A intermediate layer 2 is attached to the carrier web 1. During the processing, the intermediate layer 2 protects the circuitry pattern on the carrier web 1 and the integrated circuit on the chip 4 from ambient conditions and chemicals. The material for the intermediate layer 2 is a plastic film with suitable properties for further processing, such as a thermoplastic adhesive bonding film. On the intermediate layer 2 there is an injection moulding layer 3 which has been adhered to the intermediate layer 2.

The above description does not restrict the invention, but the invention may vary within the scope of the claims. The materials of the carrier web can be different from those presented above. The injection moulded product can be different, for example it can be a plastic transport container or another container comprising an attached body, for example a smart card blank for identification. The main idea in the present invention is that the injection moulded product comprising an attached body can be made easily and cost-effectively by using an intermediate layer between the body and the injection moulding layer.

What is claimed is:

1. An injection moulded product comprising:
   a carrier web layer which is a film selected from the group consisting of polyester and biaxially oriented polypropylene;
   a circuitry pattern and an integrated circuit on the surface of the carrier web layer;
   a melted intermediate thermoplastic layer having a first and an opposite second surface, the first surface overlying and bonded to the carrier web; and
   an injection moulded layer attached to the second surface of the intermediate layer, the intermediate layer between the carrier web layer and the injection molded layer, and the intermediate layer being melted during an injection moulding to attach it to the injection moulded layer.

2. The product according to claim 1, wherein the intermediate layer is a thermoplastic adhesive bonding film which has been melted during an injection moulding to adhere to the injection moulded layer.

3. The product according to claim 1, wherein the intermediate layer is an extruded thermoplastic film which has been melted during an injection moulding to adhere to the injection moulded layer.

4. The product according to claim 1, 2 or 3 wherein the carrier web layer, circuitry pattern, an integrated circuit on a chip and the intermediate layer comprise a smart card blank.

5. The product according to claim 4, wherein the injection moulded product is a smart card.

6. The injection moulded product according to claim 1 wherein the intermediate layer is selected from the group consisting of polyolefin, polyurethane and polyester.

7. A smart card comprising:
   a carrier web layer which is a film selected from the group consisting of polyester and biaxially oriented polypropylene;
   a circuitry pattern;
   an integrated circuit on a chip attached to the circuitry pattern, the circuitry pattern on the surface of the carrier web layer;
   a melted intermediate thermoplastic layer overlying the surface of the carrier web with the circuitry pattern; and
   an injection moulded layer, the injection moulded layer bonded to the carrier web layer by the intermediate layer which is between the injection moulded layer and the carrier web layer, the intermediate layer having been melted during an injection moulding to bond the carrier web layer to the injection molded layer to provide the smart card.

8. A smart card according to claim 7 wherein the intermediate layer is a polyurethane based composition, or a composition based on modified polyolefin.

9. The smart card according to claim 7 wherein the intermediate layer is selected from the group consisting of polyolefin, polyurethane and polyester.

10. The smart card according to claim 7 wherein the intermediate layer is a thermoplastic adhesive bonding film which has been melted during an injection moulding to attach it to the injection moulded layer.

11. The smart card according to claim 7 wherein the intermediate layer is an extruded thermoplastic film which has been melted during an injection moulding to attach it to the injection moulded layer.

12. An injection moulded radio frequency identification circuit product comprising:
    a carrier film substrate selected from the group consisting of polyester and biaxially oriented polypropylene;
    a circuitry pattern and an integrated circuit on the surface of the carrier film substrate;
    an intermediate layer over and under the carrier film substrate, each intermediate layer selected from the group consisting of a melted thermoplastic extruded layer and a melted thermoplastic adhesive bonding film; and
    an injection moulded body overlying and attached to the intermediate layers, the intermediate layers between the carrier web layer and the injection molded body, and the intermediate layers having been melted to bond the carrier film substrate to the injection moulded body.

13. The injection moulded radio frequency identification circuit product according to claim 12 wherein the intermediate layers are melted thermoplastic extruded films which are melted during an injection moulding of the injection moulded body, the melting forming the intermediate layers which adhere the injection moulded body to the carrier film substrate.

14. The injection moulded radio frequency identification circuit product according to claim 12 wherein the intermediate layers are melted thermoplastic adhesive bonding films which are melted during an injection moulding of the injection moulded body, the thermoplastic adhesive bonding films selected from the group consisting of polyolefin, polyurethane and polyester.

15. A smart card comprising:
    a carrier web layer film selected from the group consisting of polyester and biaxially oriented polypropylene;
    a circuitry pattern;
    an integrated circuit on a chip attached to the circuitry pattern, the circuitry pattern on the surface of the carrier web layer film;
    an extruded intermediate thermoplastic layer overlying the surface of the carrier web film with the circuitry pattern; and
    an injection moulded layer, the injection moulded layer bonded to the carrier web layer film by the intermediate layer which is between the injection moulded layer and the carrier web layer film, the intermediate layer having been an extruded thermoplastic film extruded over the carrier web layer film and then melted to bond the carrier web layer film to the injection molded layer during an injection moulding of the injection moulded layer to provide the smart card.

16. An injection moulded product comprising:
    a carrier web layer film selected from the group consisting of polyester and biaxially oriented polypropylene;
    a circuitry pattern;
    an integrated circuit on a chip attached to the circuitry pattern, the circuitry pattern on the surface of the carrier web layer film;
    a melted extruded thermoplastic film, the melted extruded film overlying the surface of the carrier web film with the circuitry pattern; and an injection moulded layer, the injection moulded layer bonded to the carrier web layer by the extruded melted thermoplastic film, the melted extruded thermoplastic film between the injection moulded layer and the carrier web layer, the melted extruded thermoplasic film melted during the injection moulding of the injection moulded layer to bond the carrier web layer to the injection molded layer.

17. The injection moulded product according to claim 16 wherein the melted extruded thermoplastic film is copolyester.

18. An injection moulded product comprising:
a carrier web layer which is a film selected from the group consisting of polyester and biaxially oriented polypropylene;
a circuitry pattern;
an integrated circuit on a chip attached to the circuitry pattern, the circuitry pattern on the surface of the carrier web layer film;
a melted thermoplastic adhesive bonding film selected from the group consisting of polyolefin, polyurethane and polyester, the melted film overlying the surface of the carrier web film with the circuitry pattern; and
an injection moulded layer, the injection moulded layer bonded to the carrier web layer film by the melted thermoplastic adhesive bonding film, the melted thermoplastic adhesive bonding film between the injection moulded layer and the carrier web layer film, the melted thermoplasic adhesive bonding film melted during the injection moulding of the injection moulded layer to bond the carrier web layer to the injection molded layer.

19. The product according to claim 18, wherein the injection moulded product is a smart card.

\* \* \* \* \*